June 22, 1926.
F. MÜLLER
1,589,982
METHOD OF SUPPLYING FUEL TO INTERNAL COMBUSTION ENGINES
Filed March 25, 1921    2 Sheets-Sheet 1
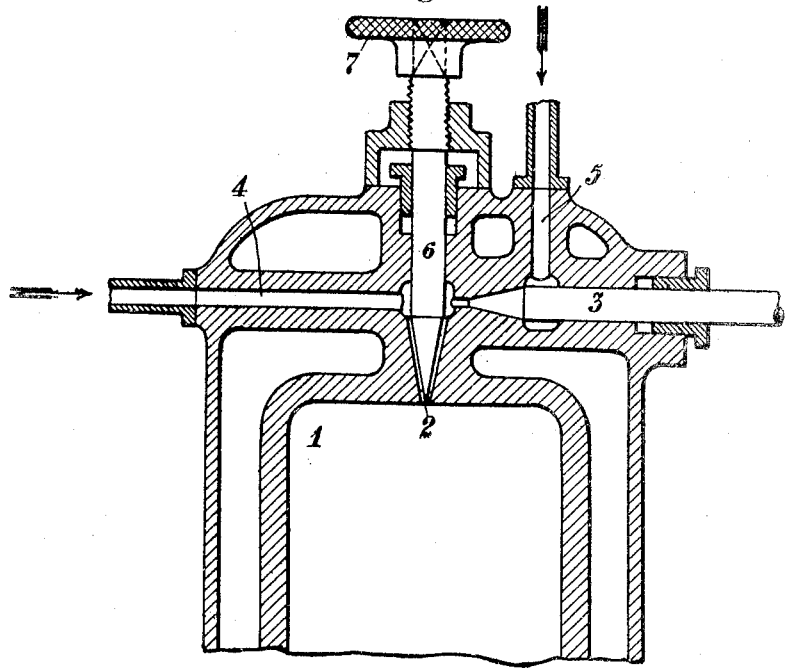
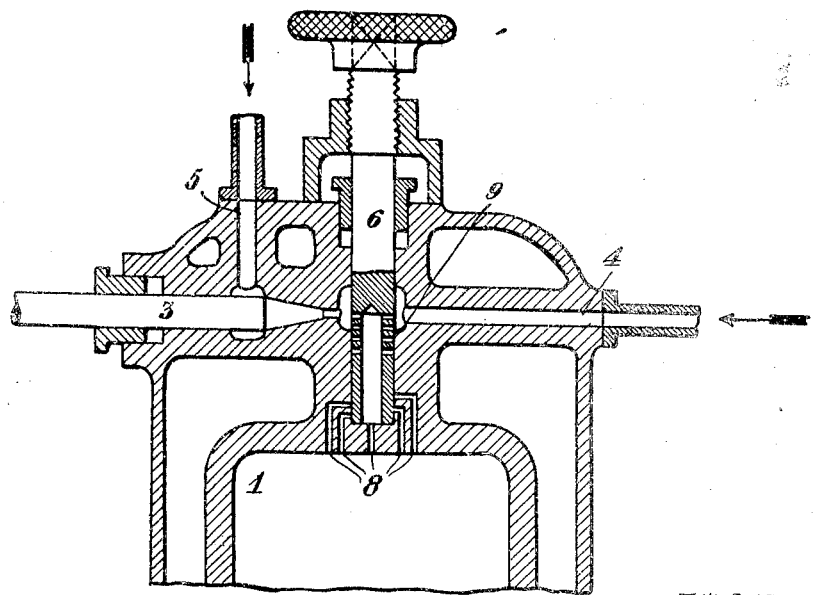
INVENTOR
Friedrich Müller

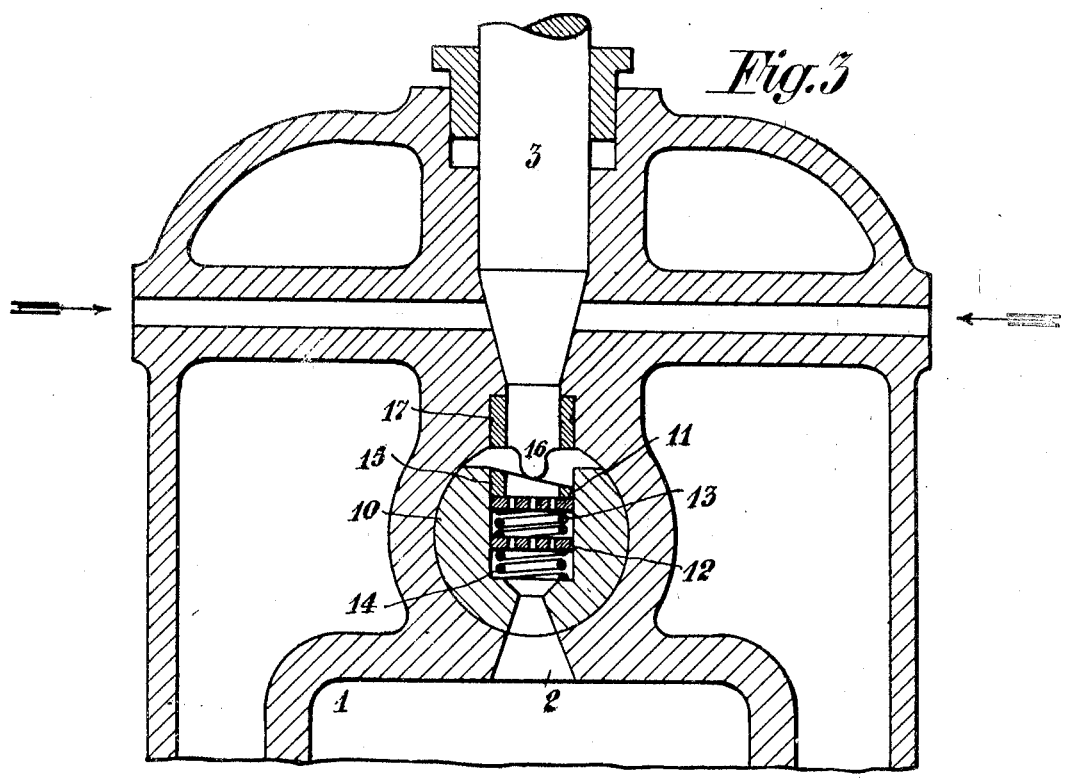
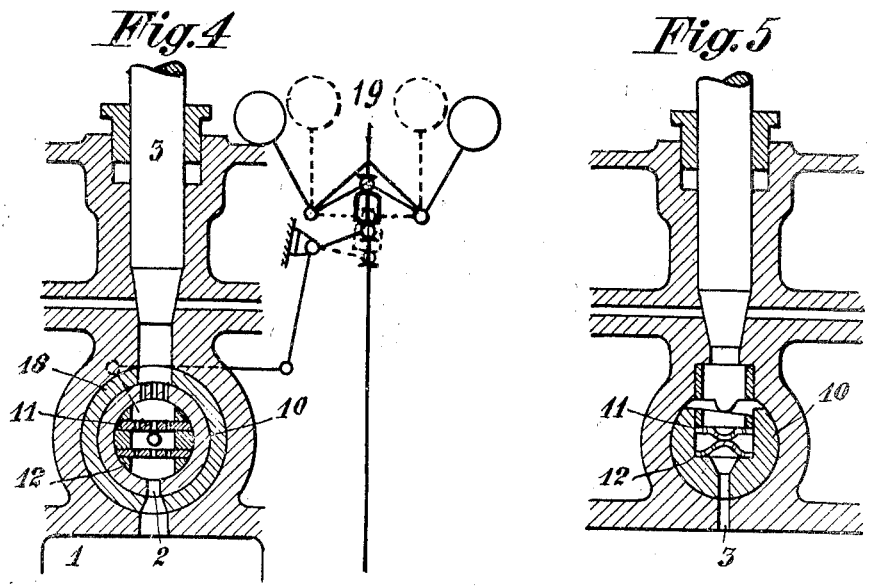

Patented June 22, 1926.

1,589,982

UNITED STATES PATENT OFFICE.

FRIEDRICH MÜLLER, OF VIENNA, AUSTRIA.

METHOD OF SUPPLYING FUEL TO INTERNAL-COMBUSTION ENGINES.

Application filed March 25, 1921, Serial No. 455,573, and in Austria February 1, 1918.

(GRANTED UNDER THE PROVISIONS OF THE ACT OF MARCH 3, 1921, 41 STAT. L., 1313.)

This invention relates to internal combustion engines working at variable speeds. As is well known, the admission of fuel into the working cylinder of an internal combustion engine is effected by means of a fuel valve, or other injection device. If the speed of the engine, namely, the piston velocity, increases, the crank shaft rotates at a greater speed and thus the fuel injection device remains open for a shorter period of time than would be the case if the engine were running at a lower speed and, consequently, the time allowed for the fuel to reach the working cylinder is shorter. At low speed, on the other hand, the time the injection valve remains open is lengthened. This gives rise to the disadvantage that too little fuel is injected into the working cylinder at high speeds and too much fuel is injected at low speeds which adversely effects the efficiency of the engine.

The object of the invention is a method of supplying the fuel, which consists in controlling the resistance to the passage of fuel through the injection device in such a manner that the resistance opposed to the passage of said fuel is varied inversely to the speed of the engine, that is to say, when the piston velocity increases, the resistance opposed to the velocity of the fuel is diminished, and when the piston velocity decreases said resistance is increased. It is thus possible to inject the right amount of fuel into the working cylinder at any load and speed and independent of the viscosity of the fuel used, notwithstanding the fact that the crank always makes approximately the same arc of rotation during each injection.

The timing of the commencement of the injection may also be capable of adjustment, in such a manner that with a high speed the injection is effected earlier than with a low speed.

It is true that fuel injecting devices for internal combustion engines have become known in which means are provided for modifying the resistance offered by the atomizer or to the passage of the operative medium. However, in these known injecting devices, in contradistinction to the method of the present invention, the resistance is reduced with the lowering of the load and a consequent smaller fuel consumption. Whereas, with greater loads it is correspondingly increased.

In order to more clearly understand the invention, reference is made to the accompanying drawings which show, by way of example, several embodiments of the invention.

In Figure 1, 1 denotes the combustion chamber, 2 the injecting nozzle and 3 the valve of a Diesel engine. The fuel is admitted through the passage 4, and the injection air through the passage 5. The adjustment of the size of the injector nozzle is effected by the regulating member 6, which is, for example, so moved by the hand-wheel 7 that, with a maximum load and speed of the engine, the injection mixture can enter the combustion chamber unhindered and at lower speed can be throttled accordingly.

In the arrangement shown in Figure 2, the injection mixture enters the combustion chamber 1 through several fine nozzles 8. The fuel entering through the passage 4 is mixed with the injection air entering through the passage 5 and controlled by the valve 3, by means of the fine openings 9 arranged in the controlling member 6. In the position shown the controlling member causes the injection mixture to enter the combustion chamber merely through a single opening, and the atomization is likewise effected only by a few of the fine openings 9. This position is intended in case the engine is running idle and at lowest speed. With increasing speed, the regulating member must be displaced upwardly. At full speed all the injecting and atomizing openings are uncovered.

Figure 3 shows an embodiment in which the injection mixture, controlled by the injector valve 3, is controlled on its way to the combustion chamber 1 by a member in the form of a movable slide 10. The injection nozzle 2 may be covered by turning this slide, so as to throttle the mixture. The atomizing members which are built in the revolving slide consists of two perforated plates 11 and 12 which are held apart by the two springs 13 and 14. By turning the slide 10 the atomizer plates are tilted towards the direction of flow of the mixture and are drawn together by the claws 16 of the inset piece 17, which press on the wedgeshaped ring 15. A further increase in the resistance to the passage of the injection mixture takes place in passing through the atomizer plates in consequence of the change of direction caused by the oblique position of these plates.

In Figure 4, the control member is likewise formed as a rotating slide valve 10. The injection mixture controlled by the valve enters through the opening in the slide casing 18, and through several openings provided in the slide 10 into the slide chamber containing the atomizer plates 11 and 12, and enters the combustion chamber 1 through the injector nozzle 2. The slide 10 is controlled by a governor 19 which, at decreasing speed, turns the slide, whereby the number of the openings terminating in the slide chamber is diminished and the injector nozzle partly obstructed.

In Figure 5, two S-like screens 11 and 12 are arranged in a revolvable slide 10 and drawn closer together when the slide is turned. The screens come into contact at highest speed. As the speed decreases the screens are pressed together and the resistance to the passage of the injection medium is increased.

What I claim to be new is:

1. The method of controlling the supply of fuel to internal combustion engines working with injection of liquid fuel, which consists in altering the cross-sectional area of the fuel injection opening into the working cylinder proportionally to the speed of the engine, the cross sectional area of said injection opening being increased as the speed of the engine increases and vice versa.

2. The method of controlling the supply of fuel to variable speed internal combustion engines working with injection of liquid fuel, which consists in maintaining constant at varying speeds the duration of injection with respect to the piston movements, and varying the cross-sectional area of the fuel injection opening into the cylinder proportionally with the speed of the engine, whereby the resistance to the passage of fuel is decreased as the engine speed increases and vice versa.

3. The method of controlling the supply of fuel to internal combustion engines working with injection of liquid fuel, which consists in altering the cross-sectional area of the fuel injection opening into the working cylinder proportionally to the speed of the engine and in addition thereto the cross-sectional area of the fuel atomizer in the same way.

FRIEDRICH MÜLLER.